United States Patent
Thomas et al.

(10) Patent No.: US 12,170,894 B2
(45) Date of Patent: Dec. 17, 2024

(54) SELECTIVE ACCESS POINT KEY CACHING

(71) Applicant: Juniper Networks, Inc., Sunnyvale, CA (US)

(72) Inventors: Jacob Thomas, Saratoga, CA (US); Sanjoy Dey, Saratoga, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 262 days.

(21) Appl. No.: 17/657,588

(22) Filed: Mar. 31, 2022

(65) Prior Publication Data

US 2023/0319555 A1    Oct. 5, 2023

(51) Int. Cl.
| | |
|---|---|
| *H04W 84/12* | (2009.01) |
| *H04L 9/08* | (2006.01) |
| *H04L 9/40* | (2022.01) |
| *H04L 67/5681* | (2022.01) |
| *H04W 8/12* | (2009.01) |
| *H04W 12/0431* | (2021.01) |
| *H04W 36/00* | (2009.01) |
| *H04W 88/08* | (2009.01) |

(52) U.S. Cl.
CPC ......... *H04W 12/0431* (2021.01); *H04W 8/12* (2013.01)

(58) Field of Classification Search
CPC ............... H04W 12/0431; H04W 8/12; H04W 84/12; H04W 36/0038; H04L 67/5681
See application file for complete search history.

(56) References Cited

U.S. PATENT DOCUMENTS

| | | | |
|---|---|---|---|
| 7,870,389 B1* | 1/2011 | Leung | H04L 9/16 713/153 |
| 11,178,728 B1* | 11/2021 | Gu | H04W 48/16 |
| 11,452,008 B2* | 9/2022 | Yuh-Ren | H04W 36/08 |
| 2004/0242228 A1* | 12/2004 | Lee | H04W 12/04 455/432.1 |
| 2012/0149367 A1* | 6/2012 | Miranda | H04W 12/062 455/432.1 |
| 2016/0183084 A1 | 6/2016 | Balasubramanian et al. | |
| 2017/0134940 A1* | 5/2017 | Sharma | H04W 12/041 |

OTHER PUBLICATIONS

Secure and Scalable Roaming Support in Heterogeneous Access Networks, by Daniel Granlund, published 2011 (Year: 2011).*

(Continued)

*Primary Examiner* — Vu V Tran
(74) *Attorney, Agent, or Firm* — Shumaker & Sieffert, P.A.

(57) ABSTRACT

An example system includes a plurality of AP devices configured to provide a wireless network at a site, the plurality of AP devices including a first AP device configured to determine a set of roaming candidates within the site for client devices connected to the first AP device, wherein the set of roaming candidates includes one or more AP devices of the plurality of AP selected according to a selection criteria; in response to establishing a connection with a client device, cache a key associated with the client device in the memory of the first AP device; generate a packet with the key associated with the client device, and a list of APs that includes one or more identifiers of the one or more AP devices within the set of roaming candidates for the first AP device; and transmit the packet to the plurality of AP devices at the site.

20 Claims, 7 Drawing Sheets

(56) References Cited

OTHER PUBLICATIONS

U.S. Appl. No. 17/453,752, filed Nov. 5, 2021, naming inventors Zohoorian et al.
U.S. Appl. No. 63/243,616, by Mohammad Zohoorian, filed Sep. 13, 2021.
Extended Search Report from counterpart European Application No. 22181556.6 dated Dec. 15, 2022, 10 pp.
Response to Extended Search Report dated Dec. 15, 2022, from counterpart European Application No. 22181556.6 filed Apr. 2, 2024, 19 pp.

* cited by examiner

SELECTIVE ACCESS POINT KEY CACHING

FIELD

The disclosure relates generally to computer networks and, more specifically, to distribution of keys across selected access points in a computer network.

BACKGROUND

Wireless access networks make use of a network of wireless access points (APs), which are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Commercial premises, such as offices, hospitals, airports, stadiums, or retail outlets, often install complex wireless network systems, including a network of wireless APs, throughout the premises to provide wireless network services to one or more wireless client devices. In cases where there are multiple APs at a site that are available to a client device, the client device typically associates with the AP that can provide the best (e.g., strongest) signal.

SUMMARY

In general, this disclosure describes techniques for propagating and caching keys, such as session keys, across selected access points (APs) configured to provide one or more wireless networks at a site. As wireless client devices move around the site, the client devices may roam between APs based on proximity and signal strength. When a client device first associates with an AP, a session key may be generated. The session key may be cached at other APs at the site for reuse, which can enable fast roaming of the client device between APs by avoiding reallocation of the keys each time the client devices connect or reconnect to a different AP at the site.

In some existing systems, key caching is typically controlled by an entity that is external to the AP. For example, a cloud based server or a wireless local area network (LAN) controller (WLC) may manage the caching of session keys by APs. A technical problem arising in existing systems is if the cloud based server or WLC becomes unavailable, APs are no longer able to cache session keys, which may lead to an increase in the time it takes for a client device to roam between APs. This increase in time can negatively affect voice calls and other applications that rely on low latency during roaming, leading to user dissatisfaction. In other existing systems, an AP may cache all session keys for all client devices connected to all APs at a site. However, this technique introduces resource usage and scaling issues due to the storage and processing requirements involved in caching all session keys at all APs for a site.

The techniques disclosed herein may be included in a practical application that provides technical advantages over existing systems. For example, an AP can obtain a session key when a client device associates with the AP. The AP can store the session key in a key cache on the AP. The AP can determine a set of other APs that are within a threshold distance (based on signal strength or other criteria) of the AP and that are likely candidates for the client device to roam to from the AP. The AP can transmit the session key to the set of APs. In some aspects, the AP sends a key notification packet as a multicast message to APs at the site. The key notification packet includes the session key of the client device and a list of identifiers for the set of APs. Each AP that receives the key notification can scan the list of identifiers to determine if it is included in the set of APs that are to cache the session key. If the receiving AP's identifier is in the list of identifiers for the set of APs, the receiving AP stores the session key in its corresponding key cache. If the receiving AP's identifier is not in the list of identifiers for the set of APs, the receiving AP does not store the session key in its corresponding key cache. The techniques disclosed herein facilitate fast roaming even when cloud based LAN control services or local LAN controllers become unavailable due to network outages or other issues. Further, the techniques disclosed herein scale well and can work in large scale environments having many APs and many client devices.

In one example, this disclosure describes a system that includes a plurality of AP devices configured to provide a wireless network at a site, the plurality of AP devices including a first AP device configured to determine a set of roaming candidates within the site for client devices connected to the first AP device, wherein the set of roaming candidates includes one or more AP devices of the plurality of AP selected according to a selection criteria; in response to establishing a connection with a client device, cache a key associated with the client device in the memory of the first AP device; generate a packet with the key associated with the client device, and a list of APs, wherein the list of APs includes one or more identifiers of the one or more AP devices within the set of roaming candidates for the first AP device; and transmit the packet to the plurality of AP devices at the site.

In another example, this disclosure describes a method that includes determining, by one or more processors of a first AP device, a set of roaming candidates for client devices connected to the first AP device, wherein the set of roaming candidates includes one or more AP devices of a plurality of AP devices configured to provide a wireless network at the site, the one or more AP devices selected according to a selection criteria; in response to establishing a connection with a client device, caching, by the one or more processors, a key associated with the client device in a memory of the first AP device; generating, by the one or more processors, a packet with the key associated with the client device and a list of APs, wherein the list of APs includes one or more identifiers of the one or more AP devices within the set of roaming candidates for the first AP device; and transmitting, by the one or more processors, the packet to the plurality of AP devices at the site.

In another example, this disclosure describes an access point (AP) device that includes a memory; and one or more processors coupled to the memory and configured to: determine a set of roaming candidates for client devices connected to the AP device, wherein the set of roaming candidates includes one or more AP devices of a plurality of AP devices configured to provide a wireless network at the site, the one or more AP devices selected according to a selection criteria, in response to establishment of a connection with a client device, cache a key associated with the client device in the memory, generate a packet with the key associated with the client device and a list of APs, wherein the list of APs includes one or more identifiers of the one or more AP devices within the set of roaming candidates for the AP device, and transmit the packet to the plurality of AP devices at the site.

The details of one or more examples are set forth in the accompanying drawings and the description below. Other features, objects, and advantages will be apparent from the description and drawings, and from the claims.

DETAILED DESCRIPTION

Figure 1:
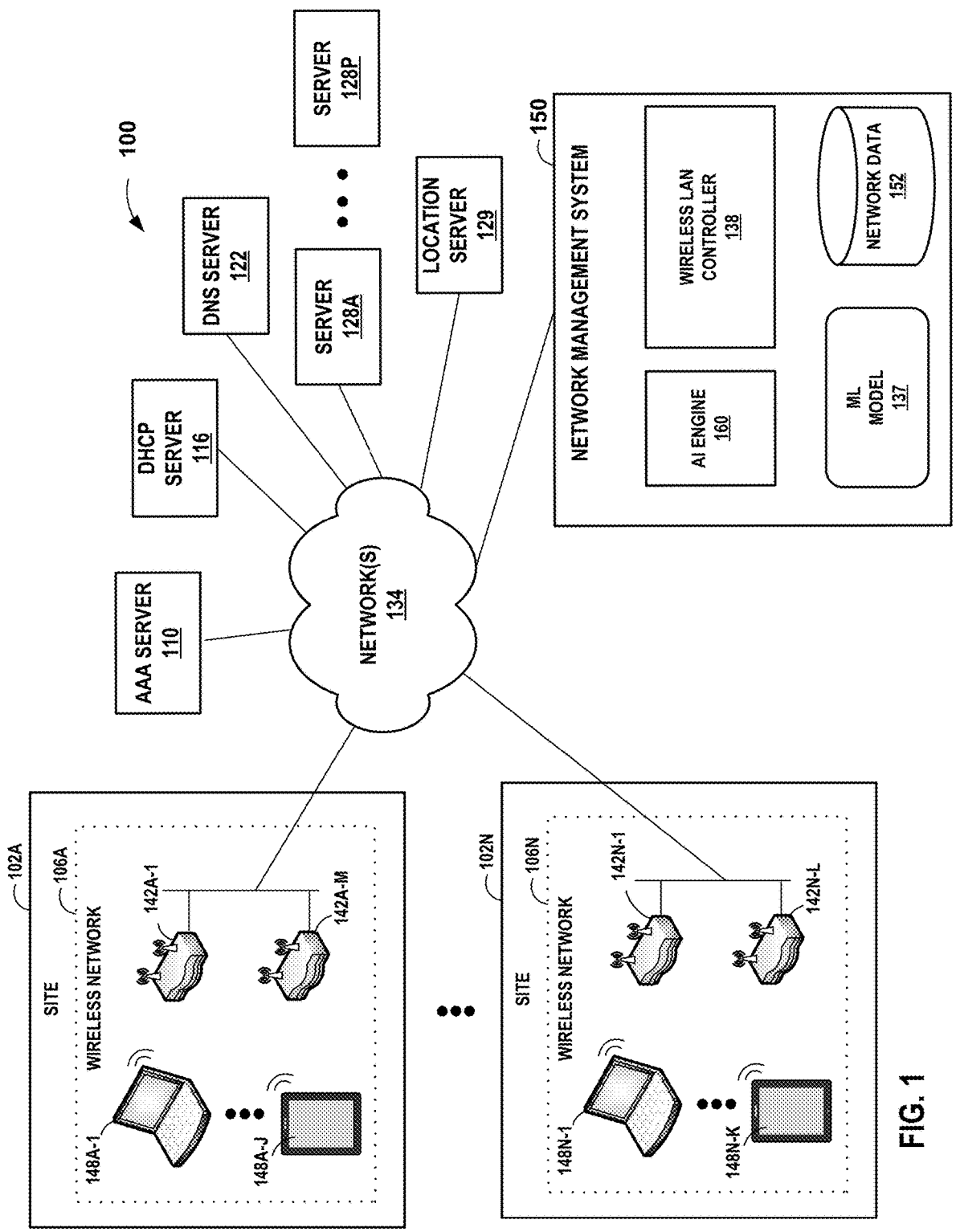
FIG. 1 is a block diagram of an example network system in which access points selectively cache session keys for client devices, in accordance with one or more techniques of the disclosure.

FIG. 1 is a block diagram of an example network system in which access points selectively cache session keys for client devices, in accordance with one or more techniques of the disclosure. Example network system 100 includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Each site 102A-102N includes a plurality of access points (APs), referred to generally as APs 142. For example, site 102A includes a plurality of APs 142A-1 through 142A-M. Similarly, site 102N includes a plurality of APs 142N-1 through 142N-L. Each AP 142 may be any type of wireless access point, including, but not limited to, a commercial or enterprise AP, a router, or any other device capable of providing wireless network access.

Each site 102A-102N also includes a plurality of client devices (also referred to as otherwise known as user equipment devices (UEs)), referred to generally as client devices 148, representing various wireless-enabled devices within each site. For example, a plurality of client devices 148A-1 through 148A-J are currently located at site 102A. Similarly, a plurality of client devices 148N-1 through 148N-K are currently located at site 102N. Each client device 148 may be any type of wireless client device, including, but not limited to, a mobile device such as a smart phone, tablet or laptop computer, a personal digital assistant (PDA), a wireless terminal, a smart watch, smart ring or other wearable device. client devices 148 may also include IoT client devices such as printers, security devices, environmental sensors, or any other device configured to communicate over one or more wireless networks.

Example network system 100 also includes various networking components for providing networking services within the wired network including, as examples, an Authentication, Authorization and Accounting (AAA) server 110 for authenticating users and/or client devices 148, a Dynamic Host Configuration Protocol (DHCP) server 116 for dynamically assigning network addresses (e.g., IP addresses) to client devices 148 upon authentication, a Domain Name System (DNS) server 122 for resolving domain names into network addresses, a plurality of servers 128 (e.g., web servers, databases servers, file servers and the like), and a network management system (NMS) 150. In some aspects, AAA server 110 can be a Remote Authentication Dial-In User Service (RADIUS) server.

Network system 100 may also include a location server 129. Location server 129 may maintain location data regarding the locations of network devices at enterprise sites 102. The location data can include the locations of APs 142. Location server 129 can determine a location by various methods. In some aspects, the location data for APs 142 may be configured, for example, by a network administrator. In some aspects, the location data for APs 142 may be learned, for example, by triangulation based on signal strengths of the APs 142. Example techniques for determining one or more locations of APs 142 and client devices 148 are described in U.S. Provisional Patent Application Ser. No. 63/125,595, entitled "DETERMINING LOCATION BASED ON DYNAMIC PATH LOSS EXPONENT (PLE) AND INTERCEPT (INT) ESTIMATION," filed Dec. 15, 2020, and U.S. Provisional Patent Application Ser. No. 63/243,616, entitled "DETERMINING LOCATIONS OF DEPLOYED ACCESS POINTS," filed Sep. 13, 2021, the entire contents of each of which is hereby incorporated by reference. The techniques described herein are not limited to any particular technique for deriving a location of APs or client devices.

As shown in FIG. 1, the various devices and systems of network 100 are coupled together via one or more network(s) 134, e.g., the Internet and/or an enterprise intranet. Each one of the servers 110, 116, 122, 128, and/or 129, APs 142, client devices 148, NMS 150, and any other servers or devices attached to or forming part of network system 100 may include a system log or an error log module wherein each one of these devices records the status of the device including normal operational status and error conditions.

In the example of FIG. 1, NMS 150 is a cloud-based computing platform that manages wireless networks 106A-106N at one or more of sites 102A-102N. NMS 150 can provide an integrated suite of management tools and implements various techniques of the disclosure. For example, NMS 150 can monitor network data, including network performance data and roaming data, associated with wireless networks 106A-106N at each site 102A-102N, respectively. NMS 150 can manage network resources, such as APs 142 at each site, to deliver a high-quality wireless experience to end users, IoT devices and clients at the site. The network data may be stored in a database associated with NMS 150, such as database 152. In general, NMS 150 may provide a cloud-based platform for network data acquisition, monitoring, activity logging, reporting, predictive analytics, network anomaly identification, invoking remedial actions, and alert generation.

For example, NMS 150 may include an AI engine 160 that analyzes network data received from one or more client devices 148 and/or one or more APs 142 in a wireless network, provides real-time insights and simplified troubleshooting for IT operations, and automatically takes corrective action or provides recommendations to proactively address wireless network issues. Additionally, AI engine 160 can analyze network data indicating roaming of client devices 148 as they roam between APs 142 to determine patterns in the roaming. These patterns may be used to determine a set of roaming candidates for an AP 142. Further, AI engine 160 can analyze proximity data such as radio frequency (RF) or WiFi proximity data to determine roaming candidates for an AP 142. For example, AI engine 160 can analyze reported RSSI or other signal strength indicators to determine APs that are in proximity to one another The set of APs that are proximate to a particular AP (e.g., within a threshold distance) may be considered roaming candidates of the AP.

NMS 150 may include wireless local area network (LAN) controller (WLC) 138. WLC 138 may be configured to use information from AI engine 160 and/or other information to build a map and/or graph of APs 142 at sites 102. WLC 138 can distribute the map and/or graph to APs 142 at sites 102 for their use in determining roaming candidates.

In operation, client devices 148 associate with APs 142 to obtain access to wireless networks 106. When a client device first associates with an AP 142, the AP generates or obtains a session key that is associated with the client device. An AP 142 can propagate the session key to a set of other APs that the client device is likely to roam to after disassociating with the AP. In some aspects, this set of other APs can be determined based on signal strength, location, or roaming patterns. According to the techniques disclosed herein, a session keys for client devices 148 can be propagated within a site 102 without the need or involvement of external controllers or NMS 150 during the actual propagation of the keys. For example, an AP 142 may select, on its own, a set of candidate APs to which a client device may roam. The AP may be assisted in the determination of the set of candidate APs by information received from NMS 150, but NMS 150 need not be involved in the actual propagation of session keys. In existing techniques, a network management system or a local controller external to the APs selects session keys for propagation. If the network management system or local controller becomes unavailable due to network issues or other issues, session key propagation is not performed, leading to a potential increase in the time it takes for a client device to associate to a new AP. This can lead to undesirable disruptions in applications such as Voice-over-IP or video streaming applications. Thus, an advantage of the techniques disclosed herein is that session key propagation can take place even when a local controller or a network management system are unavailable.

Additionally, in some aspects, the techniques disclosed herein can leverage an existing roam notification mechanism to perform the session key propagation. For example, APs typically generate a roam notification packet when a client device associates with the AP. In some implementations, an AP can add data fields to the roam notification packet that include the session key information and identifiers for APs that are to cache the session key information. Thus, the techniques disclosed herein can be incorporated into existing roam notification protocols without the need for a new protocol.

Figure 2:
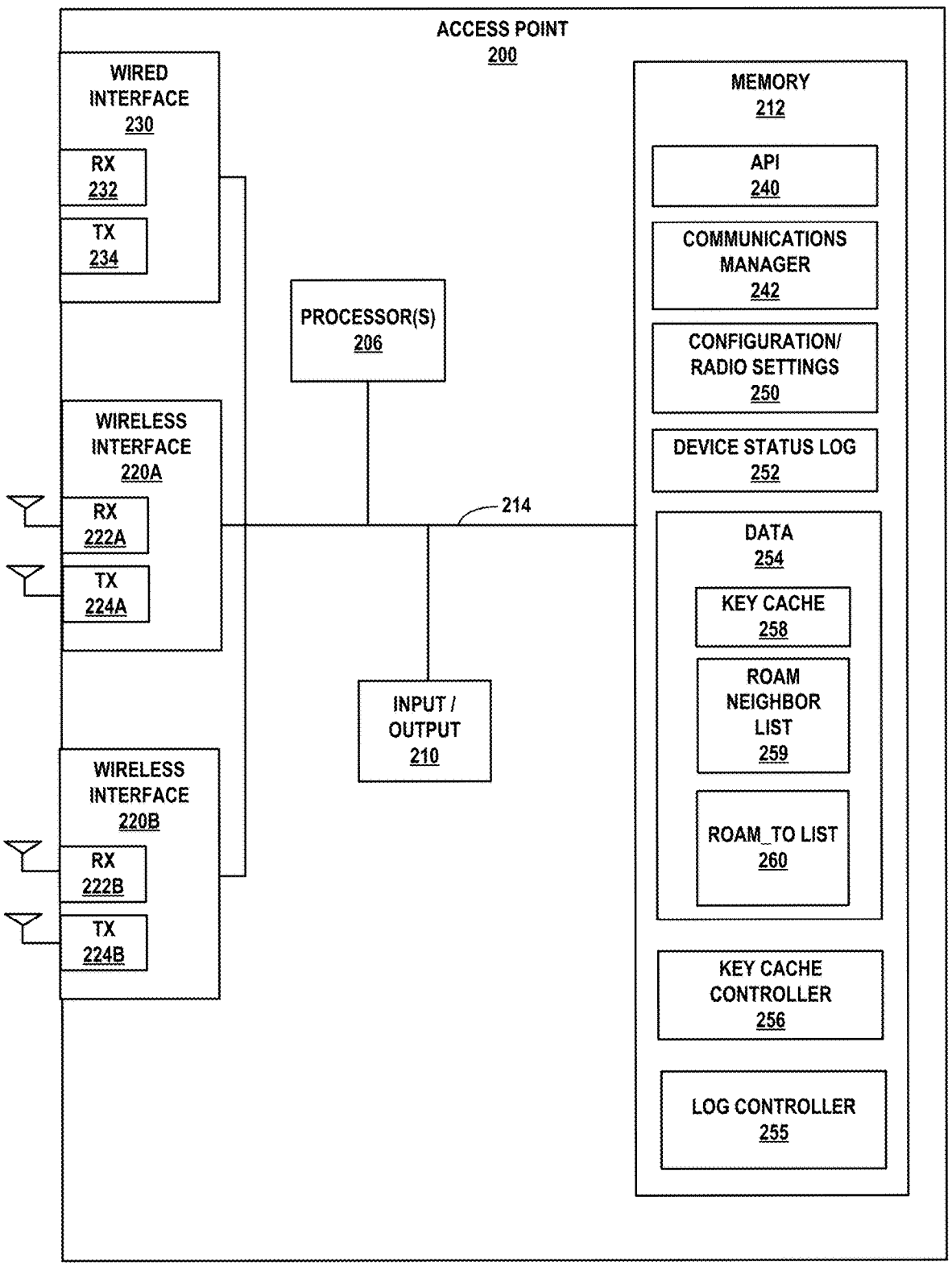
FIG. 2 is a block diagram of an example access point configured to propagate session keys to selected APs, in accordance with one or more techniques of the disclosure.

FIG. 2 is a block diagram of an example access point configured to propagate session keys to selected APs, in accordance with one or more techniques of the disclosure. Example access point 200 shown in FIG. 2 may be used to implement any of APs 142 as shown and described herein with respect to FIG. 1. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to network(s) 134 of FIG. 1. First and second wireless interfaces 220A and 220B represent wireless network interfaces and include receivers 222A and 222B, respectively, each including a receive antenna via which access point 200 may receive wireless signals from wireless communications devices, such as client devices 148 of FIG. 1. First and second wireless interfaces 220A and 220B further include transmitters 224A and 224B, respectively, each including transmit antennas via which access point 200 may transmit wireless signals to wireless communications devices, such as client devices 148 of FIG. 1. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including application programming interface (API) 240, communications manager 242, key cache controller 256, configuration settings 250, log controller 255, a device status log 252 and data storage 254. Device status log 252 includes a list of network parameters and/or network events specific to access point 200. The network parameters may include, for example, any network parameter indicative of one or more aspects of performance of the wireless network. In some examples, network parameters may include a plurality of states measured periodically as time series data that can be translated into one or more SLE metrics. The network parameters may be measured by the client device devices 148, the APs 142/200 or another device associated with the wireless network.

Network events may include, for example, access point events and/or client device events. The access point events and/or client device events may each include a log of normal network events, neutral network events, and/or error network events. The network events may include, for example, memory status, reboot events, crash events, Ethernet port status, upgrade failure events, firmware upgrade events, configuration changes, authentication events, DNS events, DHCP events, roaming events, etc., as well as a time and date stamp for each event. Log controller 255 determines a logging level for the device based on instructions from NMS 150. Data 254 may store any data used and/or generated by access point 200, including data collected from client devices 148, such as data used to calculate one or more SLE metrics, that is transmitted by access point 200 for cloud-based management of wireless networks 106 by NMS 150.

Communications manager 242 includes program code that, when executed by processor(s) 206, allow access point 200 to communicate with client devices 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and managed by NMS 150 to optimize wireless network performance in real-time, or on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Key cache controller 256 enters key data into key cache 258 and propagates keys to other APs in a network. In some aspects, the keys are session keys that are generated or obtained when a client device attempting to connect to an AP is successfully authenticated by the AP. For example, AP 200 can generate or obtain a session key when a client device 148 attempts to connect to AP 200 and is successfully authenticated. In some aspects, AP 200 can obtain the session key from AAA server 110 (FIG. 1). In some aspects, the key can be a Private Pre-Shared Key (PPSK), and AP 200 can obtain the session key from a cloud based PPSK source. Key cache controller 256 can store the session key in key cache 258 and associate the corresponding client device ID with the cache entry. Key cache controller can propagate the session key to a subset of APs in the network that are within a threshold distance from AP 200. In some aspects, key cache controller 256 can select the subset of APs from roam neighbor list 259 and roam to list 260.

In some aspects, AP 200 can receive roam neighbor list 259 from NMS 150 (FIG. 1). NMS 150 may analyze client device connections to determine connection patterns with APs at a site 102. For example, NMS 150 may maintain information regarding APs from which a client device roams prior to associating with AP 200, and client devices to which the client device roams after associating with AP 200. NMS 150 may provide this list of APs to AP 200 for inclusion in roam neighbor list 259. Additionally, NMS 150 may maintain an AP map having geographic locations of APs at a site 102. NMS 150 can provide a list of APs within a predefined or configurable geographic distance of AP 200 to AP 200 for inclusion in roam neighbor list 259. Further, NMS 150 may receive from an AP 200 signal strength information regarding signal strengths of signals received from other APs in the vicinity of AP 200. NMS 150 can determine APs for inclusion in roam neighbor list 259 based on the signal strength information. AP 200 may receive roam neighbor list 259 from NMS 150 at various points in time. For example, when AP 200 is installed on the network, AP 200 may authenticate to the network and receive a site key for the network upon successful authentication. AP 200 may receive roam neighbor list 259 from NMS 150 upon successful authentication. AP 200 may also receive roam neighbor list 259 from NMS 150 when AP 200 is booted or powered on. Further, AP 200 may receive updates to roam neighbor list 259 from NMS 150 during the operation.

Roam_to list 260 is a list of APs that are within a threshold distance of AP 200. The distance may be based on a geographical location, a signal strength, or a network topology. Generally speaking, roam_to list 260 is a list of identifiers of APs that a client device may roam_to after disassociating from AP 200. In some aspects, the AP identifier can be a Media Access Control (MAC) address of the corresponding AP. In some aspects, the AP identifier can be a unique device identifier assigned to the AP, for example a globally unique identifier (GUID). Key cache controller 256 may add identifiers for APs to roam_to list 260 in various ways. For example, key cache controller 256 can add an identifier for an AP to roam_to list 260 based on signal strength such as Received Signal Strength Indicator (RSSI). In some aspects key cache controller 256 adds an identifier for an AP to roam_to list 260 if the signal strength of a signal received from the AP is above a predefined or configurable threshold value. Key cache controller 256 may create roam_to list 260 when AP 200 is booted or powered on by scanning for signals received from other APs. Further, key cache controller 256 may update roam_to list 260 by periodically rescanning for signals from other APs, and/or through information discovered via network discovery protocol such as Link Layer Discover Protocol (LLDP).

Although described above as lists, roam_to list 260 and roam neighbor list 259 may each take other forms, such as a map or a graph that identifies candidate APs that a client device may roam_to from AP 200. Further, roam_to list 260 may have a different from roam neighbor list 259.

As discussed above, AP 200 generates or obtains a session key when a new client successfully connects with AP 200. Key cache controller 256 of AP 200 can select APs from candidate APs in roam neighbor list 259 and/or roam_to list 260, and propagate the session key for caching by the selected APs. In some aspects, key cache controller 256 creates a packet that includes the session key and a list of identifiers of the APs selected by AP 200 that are to cache the session key. In some aspects, key cache controller 256 multicasts the packet to a multicast group that includes some or all of the APs at a site 102, and those APs that are identified in the packet cache the session key included in the packet. In some aspects, key cache controller 256 can broadcast the packet on the network, and those APs that are identified in the packet cache the session key included in packet. In some aspects, key cache controller 256 can unicast the packet to each of the APs that are to cache the session key. Further details on the packet contents and packet transmission are discussed below with respect to FIG. 4.

AP 200 may also receive session key information from other APs when client devices associate with the other APs. For example, AP 200 may receive a roam notification packet from another AP. The roam notification packet may identify the MAC address of the client device that associated with the other AP, along with a list of AP identifiers corresponding to APs that are to cache a session key for the client device that is contained in the roam notification packet. Key cache controller 256 can scan the list of AP identifiers, and if the identifier corresponding to AP 200 is in the list of APs that are to cache the session key, key cache controller 256 can store the session key information in key cache 258. If the identifier corresponding to AP 200 is not in the list, key cache controller 256 can ignore the roam notification packet and the session key is not stored in the key cache 258 of AP 200.

Figure 3A:
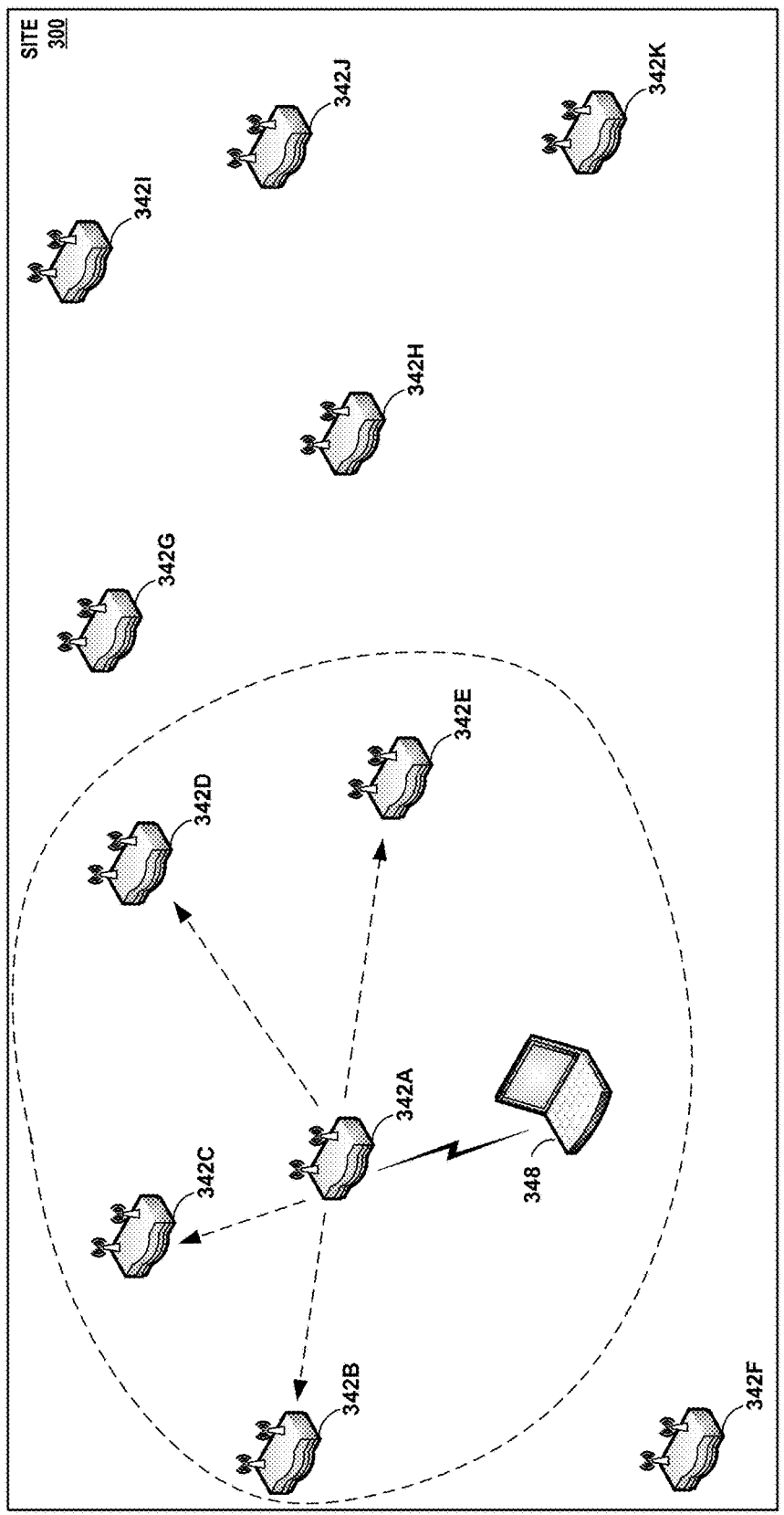
FIGS. 3A and 3B are conceptual diagrams illustrating example session key propagation, in accordance with one or more techniques of the disclosure.
Figure 3B:
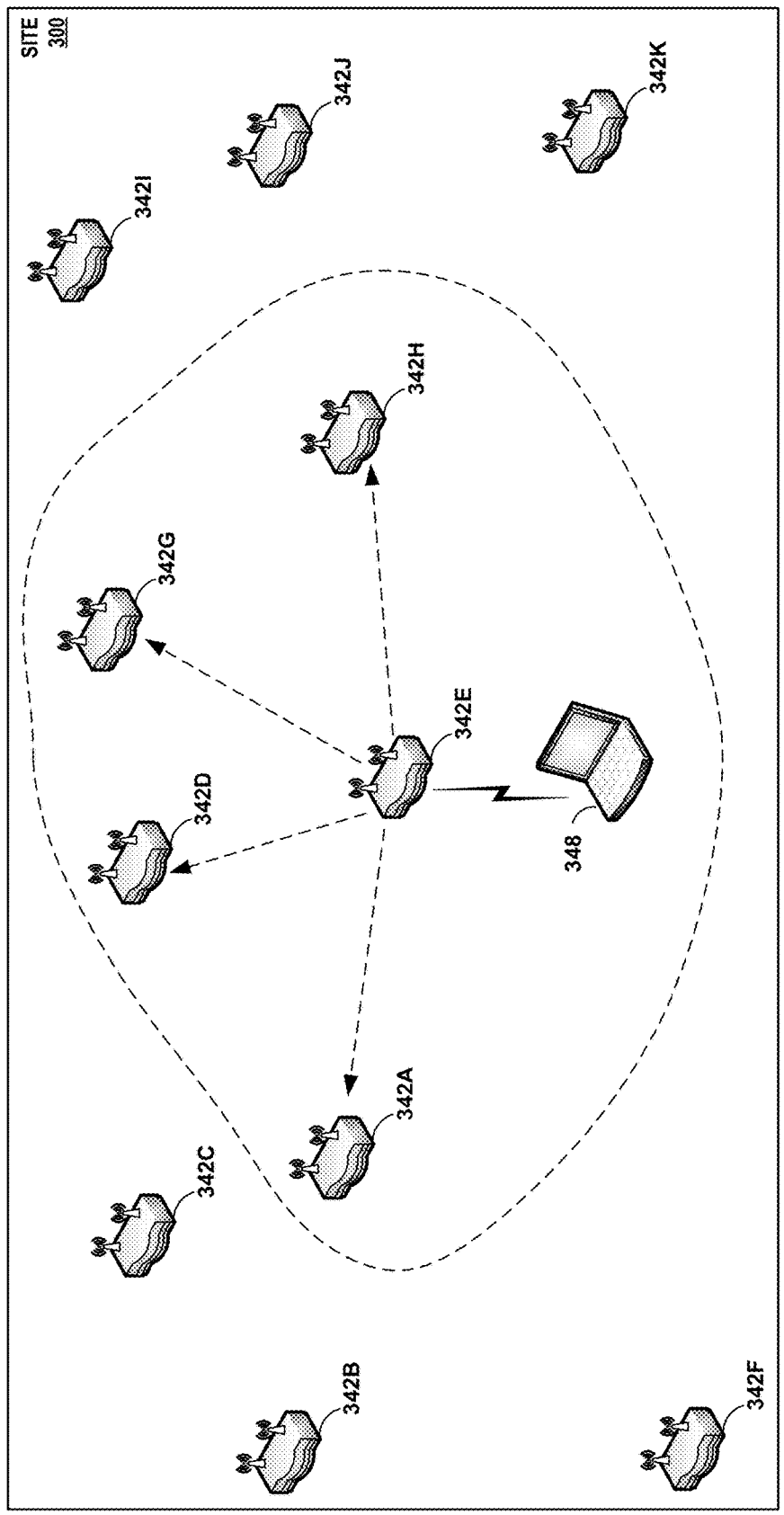

FIGS. 3A and 3B are block diagrams illustrating example session key propagation, in accordance with one or more techniques of the disclosure. In the examples shown in FIGS. 3A and 3B, a site 300 includes APs 342A-342K and a client device 348. In some aspects, APs 342 may be implementations of APs 142 of FIG. 1 and AP 200 of FIG. 2. In some aspects, client device 348 may be a client device 148 of FIG. 1.

FIG. 3A illustrates an example in which client device 348 initially associates with AP 342A to establish a communications session. As part of the association process, AP 342A authenticates client device 348. If the authentication is successful, AP 342A generates a session key. Key cache controller 256 (FIG. 2) of AP 342A then propagates the session key. In the example illustrated in FIG. 3A, key cache controller 256 has selected APs 342B-342E to receive the session key. For example, key cache controller may select APs 342B-342E based on signal strength and/or on information received from NMS 150 indicating that one or more of APs 342B-342E are part of a roaming pattern for site 300. Key cache controller 256 of AP 342A generates a roam notification packet that includes the session key associated with client device 348 and a list of identifiers (e.g., MAC addresses) of APs 342B-342E. Key cache controller 256 can multicast (or broadcast) the roam notification packet to APs 342B-342K. Upon receipt of the roam notification packet, each of APs 342B-342K scan the roam notification packet to determine if their corresponding identifier is in the list of APs that are to cache the session key. In the example shown in FIG. 3A, APs 342B-342E will find their corresponding identifiers in the list, and their respective key cache controllers will cache the session key in their corresponding key caches 258 (FIG. 2). APs 342F-342K will not find their corresponding identifiers in the list, and will not store the session key in their corresponding key caches 258.

FIG. 3B illustrates an example in which client device 348 roams from AP 342A to AP 342E. In response to a request from client device 348 to associate, AP 342E can scan its key cache 256 to determine if a session key exists for client device 348. In this example, AP 342E will find the session key corresponding to client device 348 in the key cache as a result of the previous propagation of the session key from AP 342A described above with respect to FIG. 3A. AP 342E can use the session key for communications with client device 348 without the need for reauthentication of client device 348. Key cache controller 256 (FIG. 2) of AP 342E then propagates the session key. In the example illustrated in FIG. 3B, key cache controller 256 has selected APs 342A, 342D, 342G and 342H to receive the session key. For example, key cache controller may select APs 342A, 342D, 342G and 342H based on signal strength and/or on information received from NMS 150 indicating that one or more of APs 342A, 342D, 342G and 342H are part of a roaming pattern for site 300. Key cache controller 256 of AP 342E generates a roam notification packet that includes the session key associated with client device 348 and a list of identifiers (e.g., MAC addresses) of APs 342A, 342D, 342G and 342H. Key cache controller 256 can multicast (or broadcast) the roam notification packet to APS 342A-D and 342F-342K.

Upon receipt of the roam notification packet, each of APS 342A-D and 342F-342K scan the roam notification packet to determine if their corresponding identifier is in the list of APs that are to cache the session key. In the example shown in FIG. 3B, APs 342A, 342D, 342G and 342H will find their corresponding identifiers in the list, and their respective key cache controllers will cache the session key in their corresponding key caches 258 (FIG. 2). AP 342A will already have the session key in its corresponding key cache based on the previous association of client device 348 described in FIG. 3A. AP 342B and 342D will already have the session key in its corresponding key cache based on the previous propagation of the session key from AP 342A described above in FIG. 3A. APs 342G and 342H will not have the session key in their respective key caches, and will add the session key to their caches. APs 3421-342F will not find their corresponding identifiers in the list, and will not store the session key in their corresponding key caches 258.

Figure 4:
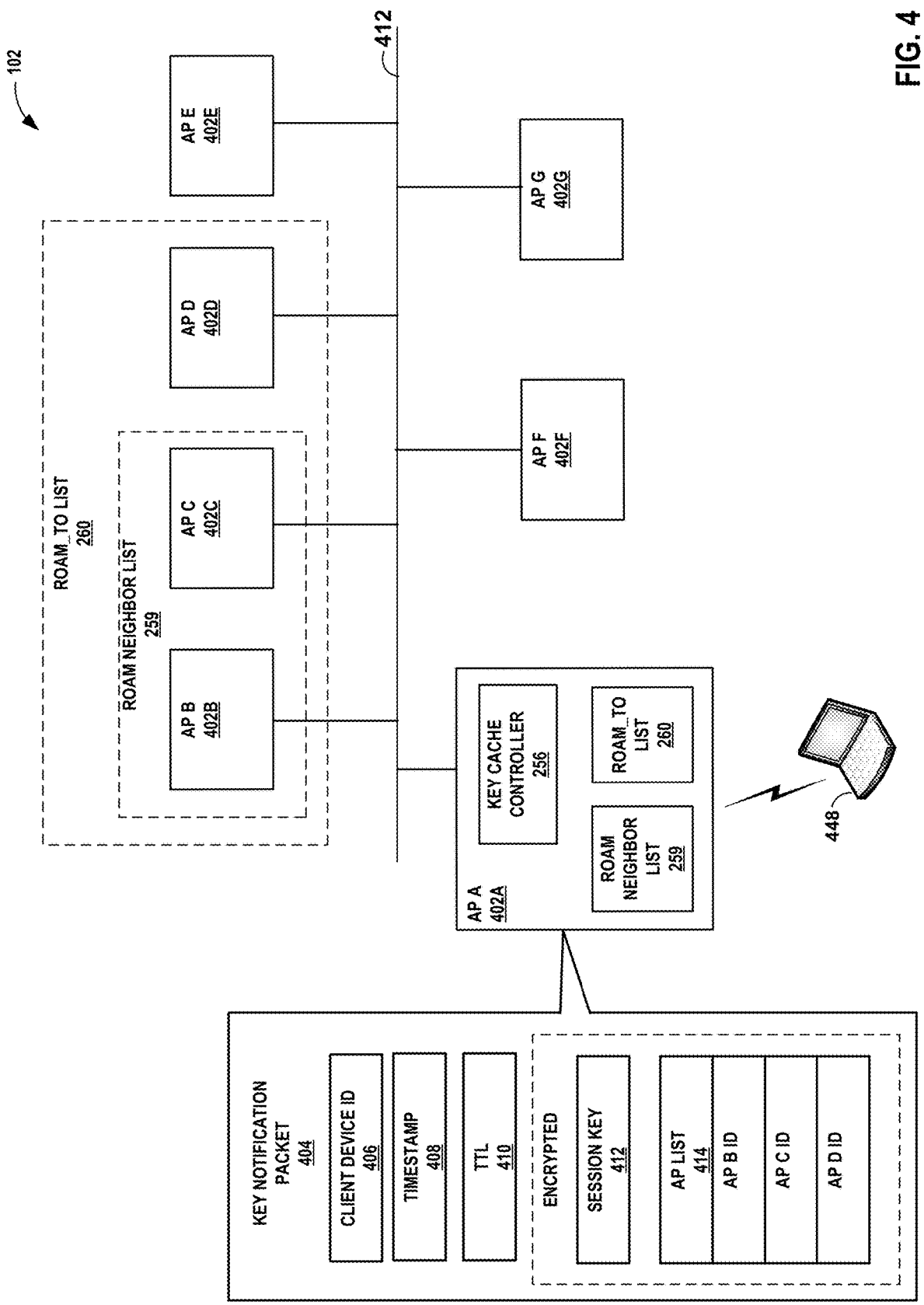
FIG. 4 is a block diagram illustrating example session key propagation message processing, in accordance with one or more techniques of the disclosure.

FIG. 4 is a block diagram illustrating example session key propagation message processing, in accordance with one or more techniques of the disclosure. In the example illustrated in FIG. 4, site 102 includes APs 402A-402G and client device 448. APs 402A-402G may be an implementation of APs 142 of FIG. 1, AP 200 of FIG. 2 or AP 342 of FIGS. 3A and 3B. APs 402A-402G may be communicatively coupled via a network 412, which may be a wired network or a wireless network such as a Bluetooth Low Energy (BLE) network. Client device 448 may be an implementation of client device 148 of FIG. 1 or client device 348 of FIG. 3. In this example, client device 448 has successfully associated with AP 402A, which has obtained a session key for client device 448. Further, in this example, AP 402A has received a roam neighbor list 259 from NMC 150 (FIG. 1), and has also created a roam_to list 260.

Key cache controller 256 of AP 402A generates a key notification packet 404 in response to the successful association of client device 448 to AP 402A. In some aspects, key notification packet 404 may be an enhanced version of a roam notification packet that may be issued in response to a successful association of a client device with an AP. In some aspects, key notification packet 404 includes client device ID 406, timestamp 408, Time-to-Live (TTL) 410, session key 412, and AP list 414. Some or all of client device ID 406, timestamp 408, TTL 410, session key 412, and AP list 414 may be formatted as Type-length-value (TLV) fields in key notification packet 404.

Client device ID 406 is a unique identifier associated with client device 448. As an example, client device ID 406 may be a MAC address associated with client device 448.

Session key 412 is the session key that was generated or obtained by AP 402A. As noted above, session key 412 may be generated or obtained from an AAA server in cases where AP 402A does not already have a session key for client device 448. Alternatively, or in addition, session key 412 may be a session key that was cached by AP 402A upon receiving the session key from another AP with which client device previously associated.

AP list 414 is a list of AP identifiers that are to cache the session key when propagated by AP 402A. Key cache controller 256 may select APs for inclusion in AP list 414 from candidate APs in roam neighbor list 259 and/or roam_to list 260. As discussed above, roam neighbor list 259 may be received from NMS 150 (FIG. 1) and may be determined by NMS 150 based on roaming patterns of client devices that associate with APs on network 412. In this example, NMS 150 has determined that client devices that associate with AP 402A typically roam_to AP 402B and AP 402C. Roam_to list 260 may be determined by AP 402A based on signal strengths of APs near AP 402A being above a threshold. In the example illustrated in FIG. 4, APs 402B, 402C and 402D have signal strengths that are above the threshold.

Key cache controller 256 may select the APs for inclusion in AP list 414 in various ways. In some aspects, key controller 256 may select AP in roam neighbor list 259 and/or roam_to list 260 based on the AP being less than a threshold distance of AP 402A. The distance may be a distance determined based on signal strength of a signal from the corresponding AP, a physical distance, or a network topology distance. The distance may be based on a density of the wireless network at a site. For example, a site may have many APs that are relatively closely spaced. In this case, the threshold distance may be less than a threshold distance for a site where APs are relatively sparse, e.g., spaced relatively far apart. Additionally, the distance may be based on a roaming type. For example, in the case of a full authentication roam that may take place when a client device is authenticated by AAA server 110, the threshold distance may be set to a greater distance than in the case of a roam using fast roaming techniques such as Opportunistic Key Caching (OKC) or Fast Basic Service Set Transition (FT) roaming. Using a smaller threshold distance can be desirable when fast roaming techniques are used in order to reduce the number of times that an AP has to process key notification packets, thereby reducing the overhead across the APs in the network. As may be appreciated from the above, signal strength may be used in multiple ways by various implementations. For example, a first threshold signal strength may be used by an AP to determine inclusion of other APs on roam_to list 260. A second signal strength threshold may be used to determine APs from roam_to list 260 that are to be included in AP list 414 to determine a finer grained selection of APs from the broader set of candidate APs in roam_to list 260 (and roam neighbor list 259).

After selecting APs for inclusion in AP list 414, key cache controller 256 transmits key notification packet 404 to APs that are on the organization's network. In some aspects, key cache controller 256 multicasts key notification packet 404 to APs that are on the same Virtual Local Area Network (VLAN) as AP 402A. In the example illustrated in FIG. 4, key cache controller 256 multicasts key notification packet 404 to all of the APs on network 412, that is, APs 402B-402G. Each of APs 402B-402G receives key notification packet 404 and the key cache controller of each AP scans AP list 414 to determine if the identifier for the corresponding AP is in the list. If the AP identifier of an AP is in the list, the key cache controller for the AP stores session key 412 in the key cache for the AP and associates the cache entry with client device id 406. If the AP identifier is not in the list, key cache controller does not store session key 412 in the key cache for the AP. Thus, in the example illustrated in FIG. 4, identifiers for APs 402B-402D are contained in AP list 414, and APs 402B-402D will store the session key in association with client device ID 406 in their corresponding key caches. Identifiers for APs 402E-402G are not contained in AP list 414, thus the corresponding key cache controller for APs 402E-402G will not store the session key in their corresponding key caches.

In some aspects, key notification packet 404 can include timestamp 408 and Time-to-Live (TTL) 410. Timestamp 408 indicates a time that key notification packet 404 was created. An AP receiving key notification packet 404 can store timestamp 408 along with session key 412 and client device ID 406 in key cache 258. As noted above, an AP may receive entries for roam neighbor list 259 from NMS 150. Further, NMS 150 may periodically update entries for roam neighbor list 259. An AP receiving key notification packet 404 can use timestamp 408 to ensure that the latest information is being stored in key cache 258. For example, due to network latency or other processing issues, an AP may receive updates for roam neighbor list 259 and may receive a key notification packet 404 out of order. The AP can compare a timestamp associated with the update to roam neighbor list 259 received from NMS 150 with timestamp 408 of key notification packet 404 to determine which information is most recent, and therefore assumed to be more accurate.

TTL 410 indicates a time that an entry should be retained in key cache 258. In some aspects, TTL 410 can be set to a value that matches the length of time that an authentication by AAA server 110 (FIG. 1) is valid. In some aspects, TTL 410 may be set to a default value such as twenty-four hours. TTL 410 may be a count-down timer that, upon reaching zero, can cause an AP to remove the associated entry from its key cache 258. The use of TTL facilitates the ability to limit resource usage of key cache 258 by deleting stale entries in the cache.

In some aspects, a portion of key notification packet 404 may be encrypted to prevent unauthorized use of session key 412. For example, in some aspects, session key 412 and AP list 414 may be encrypted using an organization key or site key that is obtained by an AP when the AP is powered on or booted. In some aspects, session key 412 may be encrypted and AP list 414 may be unencrypted. Other fields of key notification packet 404 may be encrypted in addition to, or instead of, session key 412 and/or AP list 414.

Figure 5:
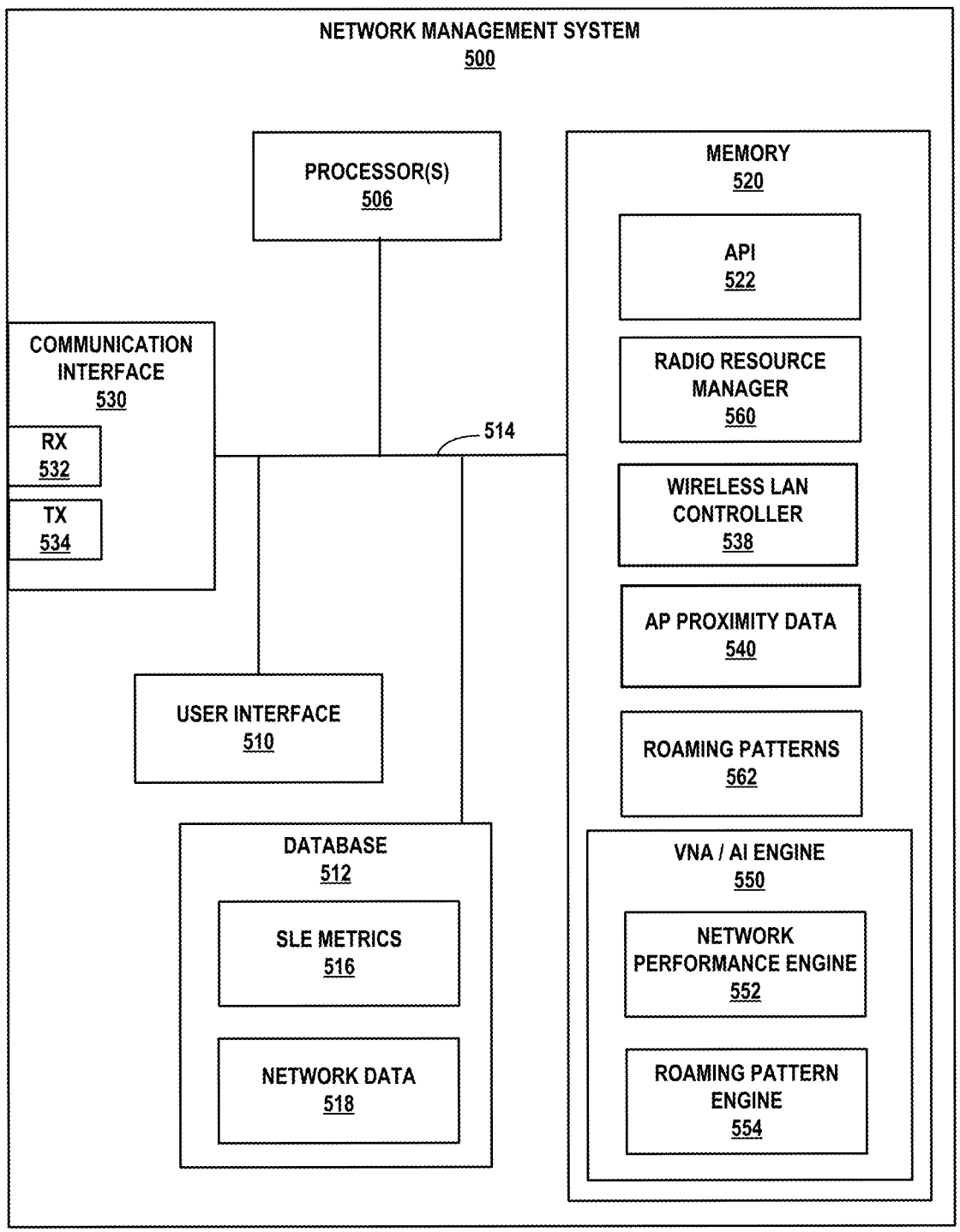
FIG. 5 is a block diagram of an example network management system, in accordance with one or more techniques of the disclosure.

FIG. 5 is a block diagram of an example network management system, in accordance with one or more techniques of the disclosure. NMS 500 may be used to implement, for example, NMS 150 in FIG. 1. In such examples, NMS 500 is responsible for monitoring and management of one or more wireless networks 106A-106N at sites 102A-102N, respectively. In some examples, NMS 500 receives network data collected and/or generated by APs 200 and can analyze such network data to determine roaming patterns of client devices with APs in networks 106A-106N. Additionally, NMS 150 may use the network data to calculate one or more SLE metrics, and for cloud-based management of wireless networks 106A-106N. In some examples, NMS 500 may be part of another server shown in FIG. 1 or a part of any other server.

NMS 500 includes a communications interface 530, one or more processor(s) 506, a user interface 510, a memory 520, and a database 512. The various elements are coupled together via a bus 514 over which the various elements may exchange data and information.

Processor(s) 506 execute software instructions, such as those used to define a software or computer program, stored to a computer-readable storage medium (such as memory 520), such as non-transitory computer-readable mediums including a storage device (e.g., a disk drive, or an optical drive) or a memory (such as Flash memory or RAM) or any other type of volatile or non-volatile memory, that stores instructions to cause the one or more processors 506 to perform the techniques described herein.

Communications interface 530 may include, for example, an Ethernet interface. Communications interface 530 couples NMS 500 to a network and/or the Internet, such as any of network(s) 134 as shown in FIG. 1, and/or any local area networks. Communications interface 530 includes a receiver 532 and a transmitter 534 by which NMS 500 receives/transmits data and information to/from any of APs 142, servers 110, 116, 122, 128, 129, and/or any other devices or systems forming part of network 100 as shown in FIG. 1. The data and information received by NMS 500 may include, for example, network data and/or event log data received from APs 142 used by NMS 500 to remotely monitor and/or control the performance of wireless networks 106A-106N. NMS may further transmit data via communications interface 530 to any of network devices such as APs 142 at any of network sites 102A-102N to remotely manage wireless networks 106A-106N.

Memory 520 includes one or more devices configured to store programming modules and/or data associated with operation of NMS 500. For example, memory 520 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 506 to perform the techniques described herein.

In this example, memory 520 includes an API 522, a virtual network assistant (VNA)/AI engine 550, WLC 538, and a radio resource management (RRM) engine 560. VNA/AI engine 550 includes a network performance engine 552 and a roaming pattern engine 554. NMS 500 may also include any other programmed modules, software engines and/or interfaces configured for remote monitoring and management of wireless networks 106A-106N, including remote monitoring and management of any of APs 142/200.

Network performance engine 552 enables set up and tracking of thresholds for SLE metrics for each of wireless networks 106A-106N. Network performance module 552 further analyzes network data collected by APs and or client devices associated with wireless networks 106A-106N, such as any of APs 142 from client devices 148 in each wireless network 106A-106N. For example, APs 142A-1 through 142A-M collect network data from client devices 148A-1 through 148A-J currently associated with wireless network 106A. This data, in addition to any network data collected by one or more APs 142A-1 through 142A-M in wireless network 106A, is transmitted to NMS 500, which executes network performance module 552 to determine one or more SLE metrics for each client device 148A-1 through 148A-J associated with wireless network 106A. One or more of the SLE metrics may further be aggregated to each AP at a site to gain insight into each APs contribution to wireless network performance at the site. The SLE metrics track whether the service level meets the configured threshold values for each SLE metric. In some examples, each SLE metric may further include one or more classifiers. If a metric does not meet the configured SLE threshold value for the site, the failure or degradation may be attributed to one of the classifiers to further understand how and/or why the failure or degradation occurred.

RRM engine 560 monitors one or more metrics for each site 106A-106N in order to learn and optimize the RF environment at each site. For example, RRM engine 560 may monitor the coverage and capacity SLE metrics for a wireless network 106 at a site 102 in order to identify potential issues with coverage and/or capacity in the wireless network 106 and to adjust the radio settings of the access points at each site to address the identified issues. For example, RRM engine 560 may determine channel and transmit power distribution across all APs 142 in each network 106A-106N. For example, RRM engine 560 may monitor events, power, channel, bandwidth, and number of clients connected to each AP. RRM engine 560 may further automatically change or update configurations of one or more APs 142 at a site 106 with an aim to improve the coverage and capacity SLE metrics and thus to provide an improved wireless experience for the user.

NMS 500 can receive information from APs 142/200 that indicates how client devices roamed within a site or organization. Such roaming information can include identification of an AP that a client device roamed to, and the AP that the client device roamed from. Roaming pattern engine 554 can analyze the roaming information to identify roaming patterns 562. For example, roaming pattern engine 554 may identify destination APs that are frequently roamed to from a particular source AP.

NMS 500 can also receive signal strength information (e.g., RSSI) and/or location information regarding APs 142/200. For example, an AP 142/200 may provide signal strength information with respect to signals received from other APs at a site 102. As another example, NMS 150 may receive location information from a site operator, or may automatically generate location information, for APs at a site 102. WLC 538 can use the signal strength information and/or location information to generate AP proximity data 540. AP proximity data may take the form of a map, graph, or lists that indicate proximity of APs to one another. NMS 500 may provide AP proximity data 540 to APs at sites 102. In some aspects, NMS 500 may provide all of AP proximity data 540 for a site 102 to an AP 142. In some aspects, NMS 500 may transmit a portion of AP proximity data that is relevant for a particular AP 142 to the AP.

NMS 500 may use roaming patterns 562 to generate a roam neighbor list 259 (FIG. 2) that indicates destination APs to which client devices typically roam_to after disassociating with the AP. NMS 500 can transmit the roam neighbor list 259 to the corresponding AP, which can use the techniques described herein to propagate session key information.

Figure 6:
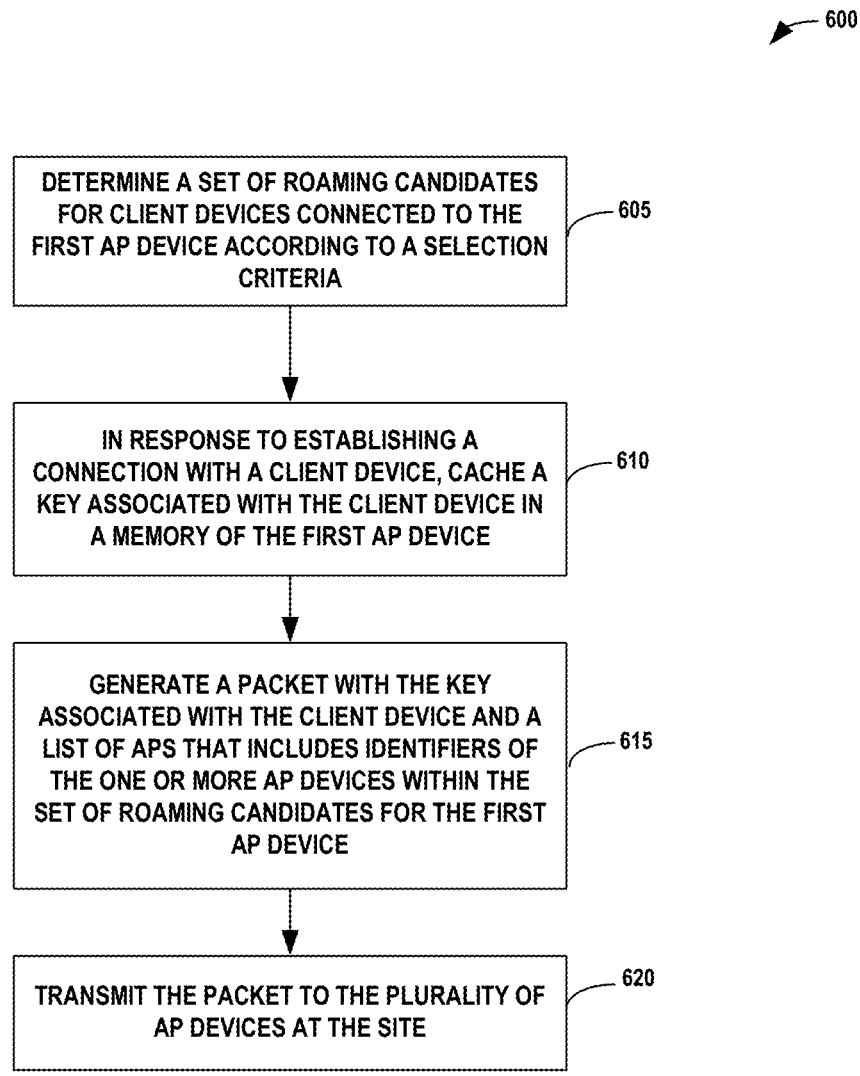
FIG. 6 is a flowchart of example operations performed by an access point to selectively propagate session keys, in accordance with one or more techniques of the disclosure.

FIG. 6 is a flowchart of example operations performed by an access point to selectively propagate session keys, in accordance with one or more techniques of the disclosure. The operations may be performed by an AP, such as APs 142 of FIG. 1, AP 200 of FIG. 2, APs 342 of FIG. 3, and/or APs 402 of FIG. 4. A first AP device may determine a set of roaming candidates for client devices connected to the first AP device, wherein the set of roaming candidates includes one or more AP devices of a plurality of AP devices configured to provide a wireless network at the site, the one or more AP devices selected according to a selection criteria (605). Moreover, the first AP device may, in response to establishing a connection with a client device, cache a key associated with the client device in a memory of the first AP device (610). Next, the first AP device may generate a packet with the key associated with the client device and a list of APs, wherein the list of APs includes one or more identifiers of the one or more AP devices within the set of roaming candidates for the first AP device (615). Next, the first AP device may transmit the packet to the plurality of AP devices at the site (620).

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer readable medium, e.g., ROM, RAM, CDs, hard discs, etc., which include machine readable instructions for controlling a machine to implement one or more operations of a method.

It is understood that the specific order or hierarchy of operations in the processes disclosed is an example approaches. Based upon design preferences, it is understood that the specific order or hierarchy of operations in the processes may be rearranged while remaining within the scope of the present disclosure. The accompanying method claims present elements of the various operations in a sample order and are not meant to be limited to the specific order or hierarchy presented.

In various examples devices and nodes described herein are implemented using one or more modules to perform the operations corresponding to one or more methods, for example, signal generation, transmitting, processing, and/or receiving operations. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method operations can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the operations of the above-described method(s). Some examples are directed to a device including a processor configured to implement one, multiple, or all of the operations of one or more methods of the one example aspect.

In some examples, the processor or processors, e.g., CPUs, of one or more devices, e.g., communications devices such as wireless terminals (UEs), and/or access nodes, are configured to perform the operations of the methods described as being performed by the devices. The configuration of the processor may be achieved by using one or more modules, e.g., software modules, to control processor configuration and/or by including hardware in the processor, e.g., hardware modules, to perform the recited operations and/or control processor configuration. Accordingly, some but not all examples are directed to a communications device, e.g., user equipment, with a processor which includes a module corresponding to each of the operations of the various described methods performed by the device in which the processor is included. In some but not all examples a communications device includes a module corresponding to each of the operations of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, operations, acts and/or steps, e.g., one or more operations described above. In some examples, the computer program product can, and sometimes does, include different code for each operation to be performed. Thus, the computer program product may, and sometimes does, include code for each individual operation of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the operations of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications—Amendment 7: Enhancements for Very High Throughput for Operation in Bands below 6 GHz", December, 2013); IEEE 802.11 ad ("IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11 ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 75 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 7G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 GHz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, 802.11k, 802.11v, & 802.11r, Wi-Fi, LTE, 7G, 5G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 7G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for propagating session key information from an AP to one or more other APs selected by the AP. Many alternatives, modifications and variations would be or are apparent to those of ordinary skill in the applicable arts. Accordingly, this disclosure is intended to embrace all such alternatives, modifications, equivalents and variations that are within the scope of this disclosure.

What is claimed is:

1. A system comprising:
    a plurality of access point (AP) devices configured to provide a wireless network at a site, the plurality of AP devices including a first AP device comprising one or more processors configured to:
        determine a set of roaming candidates within the site for client devices connected to the first AP device, wherein the set of roaming candidates includes one or more AP devices of the plurality of AP devices selected according to one or more selection criteria;
        in response to establishing a connection with a client device, cache a key associated with the client device in a memory of the first AP device;
        generate a packet that includes the key associated with the client device and a list of AP devices, wherein the list of AP devices includes one or more identifiers of the one or more AP devices within the set of roaming candidates for the first AP device; and
        transmit the packet to the plurality of AP devices at the site.

2. The system of claim 1, wherein the one or more selection criteria comprise a signal strength of a signal received by the first AP device from another AP device being above a threshold signal strength value.

3. The system of claim 2, wherein the threshold signal strength comprises a first signal strength for a session key obtained from an authentication, authorization, and accounting (AAA) server, and a second signal strength for a session key obtained via a fast roaming protocol.

4. The system of claim 2, wherein the threshold signal strength is based on a number of the plurality of AP devices at the site.

5. The system of claim 1, wherein the one or more selection criteria comprise inclusion in a list of roam neighbor AP devices generated according to a roaming pattern associated with the first AP device.

6. The system of claim 5, further comprising a network management system configured to:
    receive roaming data from the plurality of AP devices;
    generate the roam neighbor list for the first AP device based on the roaming data; and
    transmit the roam neighbor list to the first AP device.

7. The system of claim 1, wherein the one or more processors are configured to encrypt the key according to a site key for the site.

8. The system of claim 1, wherein the plurality of AP devices includes a second AP device comprising one or more processors configured to:
    receive the packet from the first AP device;
    determine that the list of AP devices in the packet includes an identifier of the second AP device as one of the roaming candidates for the first AP device;
    based on the determination, cache the key of the client device included in the packet in a memory of the second AP device; and
    in response to establishing a connection with the client device, generate a packet with the key of the client device and a list of AP devices, wherein the list of AP devices includes one or more identifiers of one or more AP devices within a second set of roaming candidates for the second AP device; and transmit the packet to the plurality of AP devices at the site.

9. The system of claim 1, wherein the plurality of AP devices includes a third AP device comprising one or more processors configured to:
receive the packet from the first AP device;
determine that the list of APs in the packet does not include an identifier of the third AP device as one of the roaming candidates for the first AP device; and
based on the determination, bypass insertion of the key into a key cache of the third AP.

10. The system of claim 1, wherein to transmit the packet to the plurality of AP devices at the site, the one or more processors of the first AP device are configured to one of multicast or broadcast the packet to the plurality of AP devices at the site.

11. A method comprising:
determining, by one or more processors of a first access point (AP) device, a set of roaming candidates for client devices connected to the first AP device, wherein the set of roaming candidates includes one or more AP devices of a plurality of AP devices configured to provide a wireless network at a site, the one or more AP devices selected according to one or more selection criteria;
in response to establishing a connection with a client device, caching, by the one or more processors, a key associated with the client device in a memory of the first AP device;
generating, by the one or more processors, a packet that includes the key associated with the client device and a list of AP devices, wherein the list of AP devices includes one or more identifiers of the one or more AP devices within the set of roaming candidates for the first AP device; and
transmitting, by the one or more processors, the packet to the plurality of AP devices at the site.

12. The method of claim 11, wherein the one or more selection criteria comprise a signal strength of a signal received by the first AP device from another AP device being above a threshold signal strength value.

13. The method of claim 12, wherein the threshold signal strength comprises one of a first signal strength for a session key obtained from an authentication, authorization, and accounting (AAA server), and a second signal strength for a session key obtained via a fast roaming protocol, wherein the first signal strength is greater than the second signal strength.

14. The method of claim 12, further comprising determining the threshold signal strength based, at least in part, on a number of the plurality of AP devices at the site.

15. The method of claim 11, further comprising:
receiving, from a network management system, a list of roam neighbor AP devices for the first AP device, wherein the one or more selection criteria comprise inclusion in a list of roam neighbor AP devices generated according to a roaming pattern associated with the first AP device.

16. The method of claim 11, further comprising encrypting the key according to a site key for the site.

17. The method of claim 11, further comprising:
receiving, by a second AP device, the packet from the first AP device;
in response to determining that the list of AP devices in the packet includes an identifier of the second AP device as one of the roaming candidates for the first AP device, caching the key of the client device included in the packet in a memory of the second AP device; and
in response to establishing a connection with the client device, generating a packet with the key of the client device and a second list of AP devices, wherein the second list of AP devices includes one or more identifiers of one or more AP devices within a second set of roaming candidates for the second AP device; and
multicasting the packet to the plurality of AP devices at the site.

18. An access point (AP) device comprising:
memory; and
one or more processors coupled to the memory and configured to:
determine a set of roaming candidates for client devices connected to the AP device, wherein the set of roaming candidates includes one or more AP devices of a plurality of AP devices configured to provide a wireless network at a site, the one or more AP devices selected according to one or more selection criteria,
in response to establishment of a connection with a client device, cache a key associated with the client device in the memory,
generate a packet that includes the key associated with the client device and a list of AP devices, wherein the list of AP devices includes one or more identifiers of the one or more AP devices within the set of roaming candidates for the AP device, and
transmit the packet to the plurality of AP devices at the site.

19. The AP device of claim 18, wherein the one or more selection criteria comprise one of:
a signal strength of a signal received by the first AP device from another AP device being above a threshold signal strength value; or
inclusion of the AP device in a list of roam neighbors of the AP device.

20. The AP device of claim 19, wherein the threshold signal strength comprises one of a first signal strength for a session key obtained from an authentication, authorization, and accounting (AAA server), and a second signal strength for a session key obtained via a fast roaming protocol, wherein the first signal strength is greater than the second signal strength.

* * * * *